United States Patent
Ishigaki

(10) Patent No.: US 10,704,507 B2
(45) Date of Patent: Jul. 7, 2020

(54) EGR VALVE INCLUDING SEAL RING

(71) Applicant: DENSO CORPORATION, Kariya, Aichi-pref. (JP)

(72) Inventor: Satoshi Ishigaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 109 days.

(21) Appl. No.: 15/752,633

(22) PCT Filed: Oct. 11, 2016

(86) PCT No.: PCT/JP2016/080053
§ 371 (c)(1),
(2) Date: Feb. 14, 2018

(87) PCT Pub. No.: WO2017/077816
PCT Pub. Date: May 11, 2017

(65) Prior Publication Data
US 2018/0258889 A1    Sep. 13, 2018

(30) Foreign Application Priority Data

Nov. 4, 2015 (JP) ................................. 2015-216544

(51) Int. Cl.
| | |
|---|---|
| *F02M 26/70* | (2016.01) |
| *F16J 15/3272* | (2016.01) |
| *F16K 1/226* | (2006.01) |
| *F16K 1/22* | (2006.01) |
| *F16J 9/14* | (2006.01) |

(Continued)

(52) U.S. Cl.
CPC ............ *F02M 26/70* (2016.02); *F02M 26/67* (2016.02); *F16J 9/14* (2013.01); *F16J 15/3272* (2013.01); *F16K 1/224* (2013.01); *F16K 1/2261* (2013.01); *F16K 1/2268* (2013.01);

(Continued)

(58) Field of Classification Search
CPC .. F16J 9/14; F16J 9/16; F16J 15/3272; F02M 26/70; F16K 1/2261; F16K 1/2268
See application file for complete search history.

(56) References Cited

U.S. PATENT DOCUMENTS

| | | | | |
|---|---|---|---|---|
| 1,363,239 A | * | 12/1920 | Ekman ........................ | F16J 9/14 277/499 |
| 1,397,334 A | * | 11/1921 | Schmolinski .............. | F16J 9/20 277/434 |

(Continued)

FOREIGN PATENT DOCUMENTS

| | | |
|---|---|---|
| JP | 05-073359 | 10/1993 |
| JP | 2008-002424 | 1/2008 |

(Continued)

*Primary Examiner* — Eugene G Byrd
(74) *Attorney, Agent, or Firm* — Nixon & Vanderhye P.C.

(57) ABSTRACT

A body of a seal ring is in an annular shape and includes an abutment joint at a location in the circumferential direction. The opposite ends of the body forming the abutment joint include an overlapping part where one end and the other end of the body overlap each other. The overlapping part includes a step cut joint that forms an overlap in the radial direction and a lap joint that forms an overlap in the plate thickness direction. Facing faces that face each other in the plate thickness direction in the lap joint are planes extending from an inner peripheral circular arc of the seal ring up to an outer peripheral circular arc of the seal ring.

5 Claims, 4 Drawing Sheets

(51) Int. Cl.
*F16K 31/04* (2006.01)
*F16K 31/53* (2006.01)
*F02M 26/67* (2016.01)
*F16J 9/16* (2006.01)
*F16J 15/16* (2006.01)

(52) U.S. Cl.
CPC .......... *F16K 31/041* (2013.01); *F16K 31/535* (2013.01); *F16J 9/16* (2013.01); *F16J 15/16* (2013.01)

(56) References Cited

U.S. PATENT DOCUMENTS

| | | | | |
|---|---|---|---|---|
| 1,428,654 A | * | 9/1922 | Norman | F16J 9/14 277/497 |
| 1,532,547 A | * | 4/1925 | Pruyn | F16J 9/14 277/499 |
| 1,635,407 A | * | 7/1927 | Grover | F16J 9/14 277/496 |
| 2,590,961 A | * | 4/1952 | Green | F16J 9/14 277/494 |
| 4,189,161 A | * | 2/1980 | Grimm | F16J 9/14 277/496 |
| 4,844,487 A | * | 7/1989 | Eakin | F16J 9/14 277/497 |
| 5,988,649 A | * | 11/1999 | Van Ryper | F16J 9/14 277/435 |
| 7,341,256 B2 | * | 3/2008 | Nakaoka | F16J 15/441 277/496 |
| 8,017,057 B2 | * | 9/2011 | Edwards | B29C 37/0075 264/109 |
| 8,876,116 B2 | * | 11/2014 | Hattori | F16J 15/3272 277/496 |
| 2004/0046329 A1 | | 3/2004 | Pieters | |
| 2016/0305545 A1 | | 10/2016 | Okazaki et al. | |

FOREIGN PATENT DOCUMENTS

| | | |
|---|---|---|
| JP | 2011-012749 | 1/2011 |
| JP | 2011-179625 | 9/2011 |

* cited by examiner

EGR VALVE INCLUDING SEAL RING

TECHNICAL FIELD

This application is the U.S. national phase of International Application No. PCT/JP2016/080053 filed Oct. 11, 2016, which designated the U.S. and claims priority to Japanese Patent Application No. 2015-216544 filed on Nov. 4, 2015, the entire contents of each of which are incorporated herein by reference.

CROSS REFERENCE TO RELATED APPLICATION

The present disclosure relates to a seal ring including an abutment joint.

BACKGROUND ART

A seal ring that is made of a hard material such as a resin or metal is provided with an abutment joint for absorbing a difference in linear expansion. The abutment joint is a separated part in the circumferential direction in the seal ring. When being in the free length of the seal ring in a no-load condition, the opposite ends of the seal ring, the opposite ends forming the abutment joint, are separated from each other in the circumferential direction, and the outer diameter dimension of the seal ring is slightly larger than the inner diameter dimension of an assembled object (e.g., a nozzle). When the seal ring is assembled to the inside of an inner wall of the assembled object, the outer peripheral edge of the seal ring is pressed against the inner wall of the assembled object, and the outer peripheral edge of the seal ring fits with the inner wall of the assembled object.

The opposite ends of the seal ring, the opposite ends forming the abutment joint, may not be aligned, but may be displaced from each other in the radial direction due to a local load applied to the seal ring when a valve is opened or due to distortion that occurs in the seal ring. In order to prevent the displacement, there has been proposed a seal ring provided with a step cut joint that prevents a displacement in an abutment joint in the radial direction by engaging the ends of the seal ring, the ends forming the abutment joint, with each other in the radial direction (e.g., refer to Patent Literature 1). However, in the configuration of Patent Literature 1, there is an apprehension that a gap may be formed in the abutment joint, and fluid may leak through the gap.

PRIOR TECHNICAL LITERATURE

Patent Literature

PATENT LITERATURE 1: Publication of unexamined Japanese Patent Application No. 2011-12749

SUMMARY OF INVENTION

It is an object of the present disclosure to produce a seal ring that is to prevent a displacement in an abutment joint in the radial direction and has no gap in the abutment joint A.

A seal ring 12 which is provided with a step cut joint 15 formed in an abutment joint A in a comparative example will be described with reference to FIGS. 4A to 4C. It is to be noted that the same functional objects as those of the embodiment described below are designated by the same reference signs as those of the embodiment.

The step cut joint 15 forms overlaps in both of a radial direction y and a plate thickness direction z of the seal ring 12. The step cut joint 15 restricts sliding of the ends of the seal ring 12 in the radial direction y and allows sliding of the ends of the seal ring 12 in a circumferential direction x.

As illustrated in FIGS. 4A to 4C, the step cut joint 15 disclosed in Patent Literature 1 includes locking pieces 15a and locked pieces 15b. Each of the locking pieces 15a extends in the circumferential direction x from the end of the seal ring 12 and is formed on the outer diameter side of the seal ring 12. Each of the locked pieces 15b is engaged with the locking piece 15a in the radial direction y and formed on the inner diameter side of the seal ring 12. That is, a configuration is employed where the locking piece 15a on one end of the seal ring 12 and the locking piece 15a on the other end of the seal ring 12 overlap each other in the plate thickness direction z on the outer diameter side of the seal ring 12. Employing the above structure makes it possible to close a gap α in the abutment joint A through which fluid may leak in the plate thickness direction on the outer diameter side of the seal ring 12.

However, even when the locking pieces 15a are formed on the outer diameter side of the seal ring 12 as with Patent Literature 1, the gap a in the abutment joint A is formed on the inner diameter side of the seal ring 12. Thus, there is an apprehension that fluid may leak through the gap α in the abutment joint A formed on the inner diameter side of the seal ring 12 even when a valve is fully closed.

According to one aspect of the present disclosure, a seal ring comprises a body in an annular shape and including an abutment joint at a location in a circumferential direction. Opposite ends of the body form the abutment joint and include an overlapping part where one end and an other end of the body overlap each other. The overlapping part includes a step cut joint that forms an overlap in a radial direction and a lap joint that forms an overlap in a plate thickness direction. Facing faces that face each other in the plate thickness direction in the lap joint are planes extending from an inner peripheral circular arc of the seal ring up to an outer peripheral circular arc of the seal ring.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Embodiments for carrying out the disclosure will be described with reference to the drawings. It is to be noted that the embodiments disclosed below are mere examples, and the present disclosure is not limited to the following embodiments.

First Embodiment

A first embodiment will be described with reference to FIGS. 1 to 3D. In the first embodiment, the present disclosure is applied to an EGR valve 1 of an EGR apparatus which is mounted on an engine for traveling of an automobile.

The EGR apparatus is a technique for reducing a combustion temperature in an engine combustion chamber by recirculating part of exhaust gas discharged from an engine to an intake side of the engine as EGR gas to mix the EGR gas which is uninflammable gas into part of intake air. The EGR apparatus is provided with an EGR valve 1 which opens and closes an EGR passage 2 through which a part of exhaust gas flowing through an exhaust passage is recirculated to an intake passage and adjusts an opening degree of the EGR passage 2. The EGR valve 1 may be one used in a high-pressure EGR apparatus or one used in a low-pressure EGR apparatus.

Figure 1:
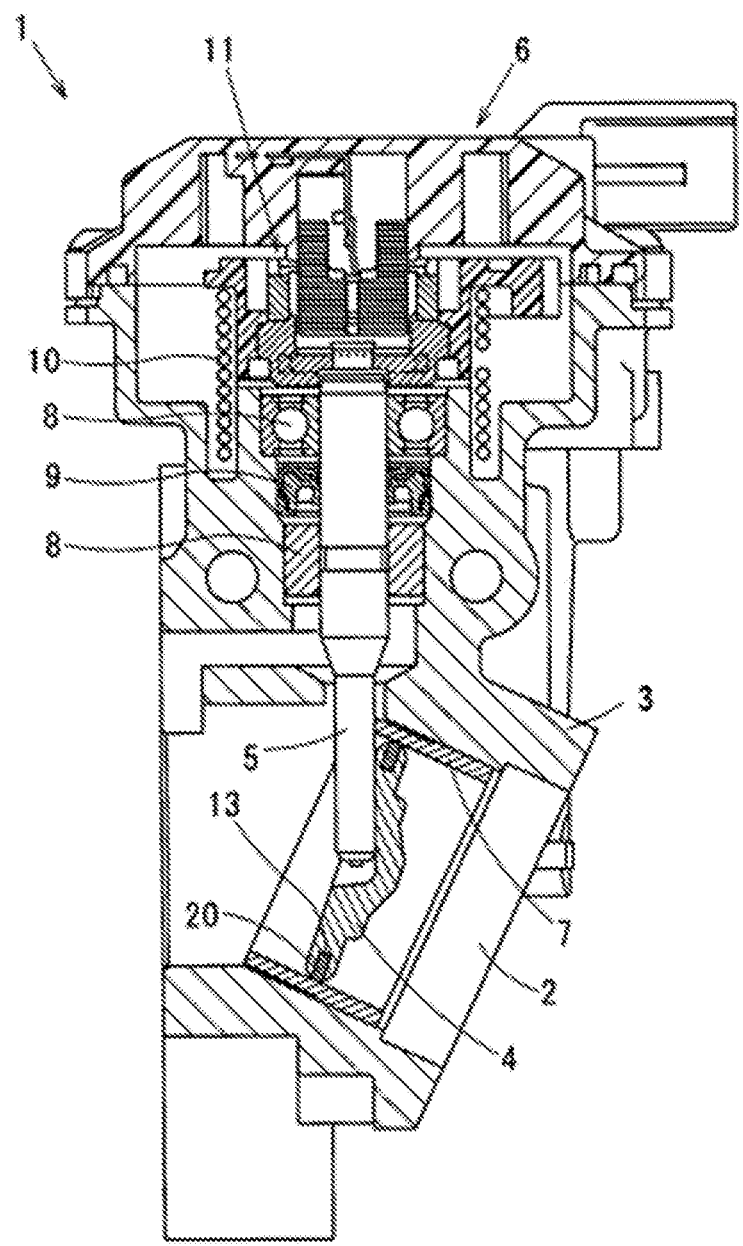
FIG. 1 is a schematic sectional view of an EGR valve.
Figure 2:
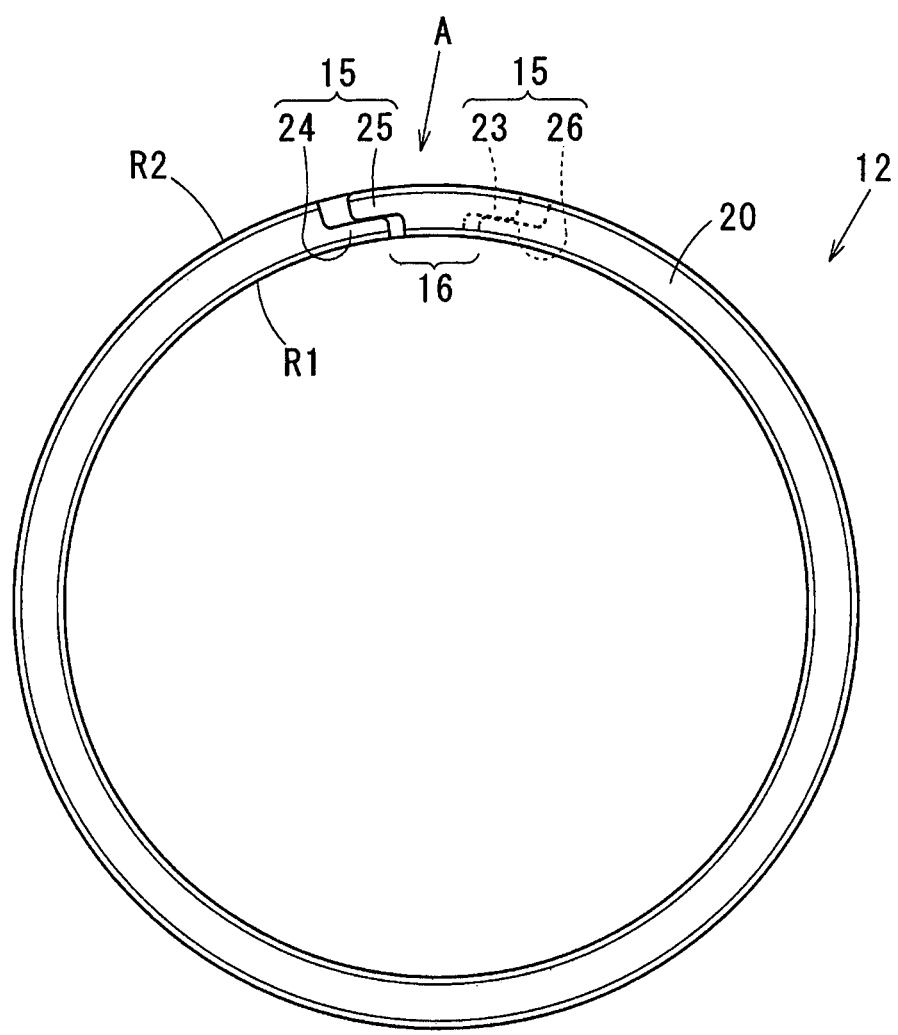
FIG. 2 is a general view of a seal ring.

A concrete example of the EGR valve 1 will be described with reference to FIG. 1. Note that although, in the following description, the upper side in the drawing is defined as an upper side and the lower side in the drawing is defined as a lower side, these upper and lower directions are used only for describing the embodiments and do not limit the present disclosure. The EGR valve 1 is provided with a housing 3 which forms a part of the EGR passage 2 inside the housing 3. The EGR valve 1 is provided with a butterfly valve 4 which is capable of opening and closing the EGR passage 2. The EGR valve 1 is provided with an electric actuator 6 which turns the butterfly valve 4 via a shaft 5 which is rotatably supported with respect to the housing 3.

The housing 3 is a die-cast made of an aluminum alloy. A nozzle 7 is provided in a fixed manner on an inner wall of the EGR passage 2. The nozzle 7 is made of a metallic material that is excellent in heat resistance and wear resistance (e.g., stainless steel) and formed in a tubular shape. The inside of the nozzle 7 forms a part of the EGR passage 2. The butterfly valve 4 is in a generally disc shape. The butterfly valve 4 opens and closes the EGR passage 2 according to a rotational position of the shaft 5, and variably adjusts an opening area of the EGR passage 2.

The shaft 5 turnably supports the butterfly valve 4 inside the nozzle 7. An axis of the shaft 5 in the present embodiment is tilted relative to the center line of the nozzle 7. The shaft 5 supports the butterfly valve 4 in a cantilever manner. The butterfly valve 4 in a tilted state is fixed to the lower end of the shaft 5.

The shaft 5 is rotatably supported by two bearings 8 which are provided only on the upper side of the EGR passage 2. The two bearings 8 are spaced apart from each other in the up-down direction. Each of the bearings 8 may be a rolling bearing such as a ball bearing or a plain bearing such as a metal bearing.

Further, a seal member 9 which prevents leakage of the EGR gas is provided between the housing 3 and the shaft 5. In FIG. 1, the seal member 9 which is an independent member is provided between the two bearings 8. Alternatively, bearings 8 having a seal function may be used differently from the structure of FIG. 1.

The electric actuator 6 is fixed to the upper part of the housing 3 and rotates the shaft 5. The electric actuator 6 is a known actuator and provided with an electric motor which generates a rotational power by energization and a speed reducer which amplifies the rotational torque of the electric motor and transmits the amplified rotational torque to the shaft 5. Further, the electric actuator 6 illustrated in FIG. 1 is provided with a return spring 10 which returns the shaft 5 to the initial position and a rotational angle sensor 11 which detects a rotational angle of the shaft 5.

An ECU which controls the engine energizes the electric motor, so that the opening degree of the butterfly valve 4 is controlled to adjust the amount of EGR gas recirculated to the intake passage of the engine.

As described above, the butterfly valve 4 is turned to adjust the amount of EGR gas. A seal ring 12 is provided on the outer peripheral edge of the butterfly valve 4. The seal ring 12 closes a gap between the butterfly valve 4 and the inner peripheral wall of the nozzle 7 when the butterfly valve 4 is fully closed. Specifically, the seal ring 12 is fitted in an annular groove 13 which is formed over the entire outer peripheral edge of the butterfly valve 4.

The seal ring 12 is provided with a body 20. The body 20 is a wired rod which has a generally quadrangular cross section and is formed in an annular shape. The body 20 includes an abutment joint A for absorbing a difference in linear expansion at one location in a circumferential direction x. The abutment joint A is a separated part in the circumferential direction x in the seal ring 12. In the free length of the seal ring 12, the outer diameter dimension of the seal ring 12 is slightly larger than the inner diameter dimension of the nozzle 7. When the seal ring 12 is assembled into the nozzle 7, the outer peripheral edge of the seal ring 12 is pressed against the inner wall of the nozzle 7, and the outer peripheral edge of the seal ring 12 fits with the inner peripheral wall of the nozzle 7 when it is fully closed. Further, even when a change in expansion occurs in the butterfly valve 4, the nozzle 7, and the seal ring 12, the outer peripheral edge of the seal ring 12 is constantly kept in contact with the inner wall of the nozzle 7 when it is fully closed.

The opposite ends of the seal ring 12, the opposite ends forming the abutment joint A, include an overlapping part 14 where one end and the other end of the seal ring 12 overlap each other. The overlapping part 14 includes a step cut joint 15 which forms an overlap in a radial direction y to restrict a displacement in the abutment joint A in the radial direction y and a lap joint 16 which forms an overlap in a plate thickness direction z.

The step cut joint 15 will be described. The step cut joint 15 forms an overlap in the radial direction y of the seal ring 12 to restrict sliding of the ends of the seal ring 12 in the radial direction y and to allow sliding of the ends of the seal ring 12 in the circumferential direction x. Specifically, the step cut joint 15 is formed as a combination of a plane part which forms an overlap in the plane thickness direction z and an engagement part which forms an overlap in the radial direction y. In the following description, one of the opposite ends of the seal ring 12 forming the abutment joint A, is referred to as a first end B, and the other end is referred to as a second end C.

The plane part is a plane that is perpendicular to the plate thickness direction z and is formed by cutting the seal ring 12 in half in the thickness direction z. Specifically, the plane part is formed on each of the first end B and the second end C. In the following description, the plane part formed on the first end B is referred to as a first plane part 21, and the plane part formed on the second end C is referred to as a second plane part 22. The first plane part 21 and the second plane part 22 overlap each other in the plate thickness direction z and are slidable in the circumferential direction x in the overlapping state.

The engagement part has a cross section having a step shape. The engagement part includes a locking piece which extends in the circumferential direction x at the end of the seal ring 12 and a locked piece which is engaged with the locking piece in the radial direction y. The locking piece is formed on the outer diameter side of the seal ring 12. On the other hand, the locked piece is formed on the inner diameter side of the seal ring 12. Conversely, the locking piece may be formed on the inner diameter side of the seal ring 12, and the locked piece may be formed on the outer diameter side of the seal ring 12.

Specifically, the first end B includes the locking piece and the locked piece, and the second end C includes the locking piece and the locked piece. In the following description, the locking piece and the locked piece on the first end B are referred to as a first locking piece 23 and a first locked piece 24, respectively. Further, the locking piece and the locked piece on the second end C are referred to as a second locking piece 25 and a second locked piece 26, respectively.

The first locking piece 23 is a projection that extends in the circumferential direction x on the outer diameter side of the first end B. The inner peripheral face of the first locking piece 23 is formed in a circular arc face extending in the circumferential direction x. This circular arc face is referred to as a first inward circular arc face 27. Similarly, the second locking piece 25 is a projection that extends in the circumferential direction x on the outer diameter side of the second end C. The inner peripheral face of the second locking piece 25 is formed in a circular arc face extending in the circumferential direction x. This circular arc face is referred to as a second inward circular arc face 28.

The first locked piece 24 is a step that extends in the circumferential direction x on the inner diameter side of the first end B. The outer peripheral face of the first locked piece 24 is formed in a circular arc face extending in the circumferential direction x. This circular arc face is referred to as a first outward circular arc face 29. Similarly, the second locked piece 26 is a step that extends in the circumferential direction x on the inner diameter side of the second end C. The outer peripheral face of the second locked piece 26 is formed in a circular arc face extending in the circumferential direction x. This circular arc face is referred to as a second outward circular arc face 30.

The first inward circular arc face 27, the second inward circular arc face 28, the first outward circular arc face 29, and the second outward circular arc face 30 described above are perpendicular to the radial direction y. Further, the first inward circular arc face 27, the second inward circular arc face 28, the first outward circular arc face 29, and the second outward circular arc face 30 are all formed in circular arcs whose center points correspond to a ring center of the seal ring 12. The first inward circular arc face 27 and the second outward circular arc face 30 overlap and make contact with each other in the radial direction y, and the second inward circular arc face 28 and the first outward circular arc face 29 overlap and make contact with each other in the radial direction y. Forming the step cut joint 15 in this manner restricts sliding of the ends of the seal ring 12 in the radial direction y and allows sliding of the ends of the seal ring 12 in the circumferential direction x.

Next, the lap joint 16 will be described. A circular arc that forms the inner peripheral edge of the seal ring 12 is referred to as an inner peripheral circular arc R1, and a circular arc that forms the outer peripheral edge of the seal ring 12 is referred to as an outer peripheral circular arc R2. Facing faces that face each other in the plate thickness direction z in the lap joint 16 are formed in planes extending from the inner peripheral circular arc R1 up to the outer peripheral circular arc R2.

The facing faces will be specifically described. Each of the facing faces is a plane perpendicular to the plate thickness direction z and has a shape formed by cutting the seal ring 12 in half in the plate thickness direction z. That is, in a case where the facing face on the first end B is referred to as a first facing face 31, and the facing face on the second end C is referred to as a second facing face 32, the first facing face 31 is a plane continuous with the first plane part 21, and the second facing face 32 is a plane continuous with the second plane part 22.

Figure 3A:
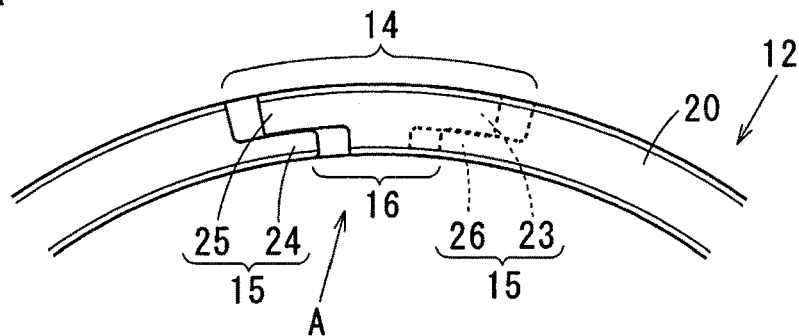
FIG. 3A is a view of an abutment joint of the seal ring according to a first embodiment, the abutment joint being viewed along a plate thickness direction z.
Figure 3B:
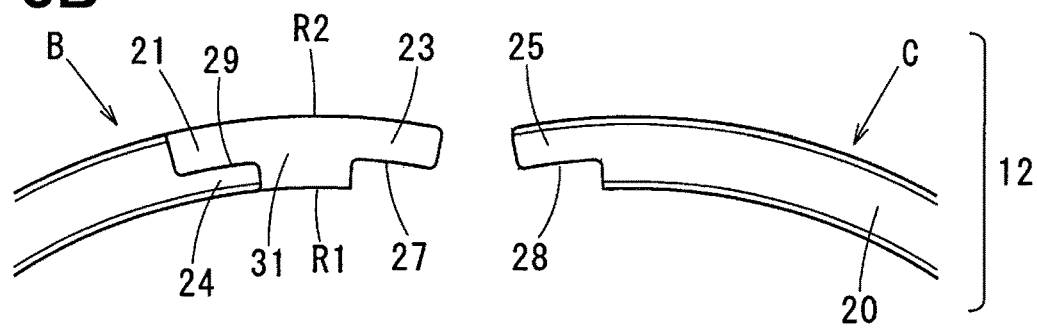
FIG. 3B is a view of the abutment joint in a separated state of the seal ring according to the first embodiment, the abutment joint being viewed from one side in the plate thickness direction z.

In the first end B, a range in the circumferential direction x in which the step cut joint 15 is formed and a range in the circumferential direction x in which the lap joint 16 is formed are adjacent to each other in the circumferential direction x. That is, as illustrated in FIG. 3B, a range in the circumferential direction x in which the first locking piece 23 and the first locked piece 24 are formed and a range in the circumferential direction x in which the first facing face 31 is formed are adjacent to each other in the circumferential direction x.

Figure 3C:
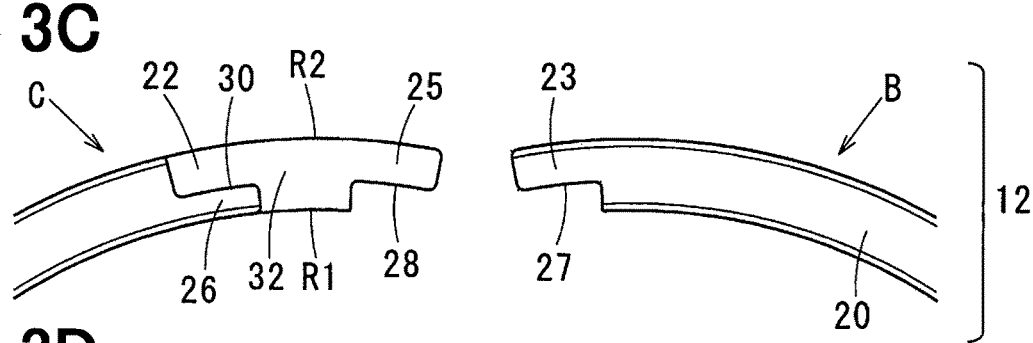
FIG. 3C is a view of the abutment joint in a separated state of the seal ring according to the first embodiment, the abutment joint being viewed from the other side in the plate thickness direction z.

Similarly, in the second end C, a range in the circumferential direction x in which the step cut joint 15 is formed and a range in the circumferential direction x in which the lap joint 16 is formed are adjacent to each other in the circumferential direction x. That is, as illustrated in FIG. 3C, ranges in the circumferential direction x in which the second locking piece 25 and the second locked piece 26 are formed and a range in the circumferential direction x in which the second facing face 32 is formed are adjacent to each other in the circumferential direction x.

The first facing face 31 is a plane that is continuous from the inner peripheral circular arc R1 up to the outer peripheral circular arc R2. Similarly, the second facing face 32 is a plane that is continuous from the inner peripheral circular arc R1 up to the outer peripheral circular arc R2. Forming the lap joint 16 in this manner enables the first facing face 31 and the second facing face 32 to slide in the circumferential direction x in an overlapping state in the plate thickness direction z.

First Effect of First Embodiment

Figure 4A:
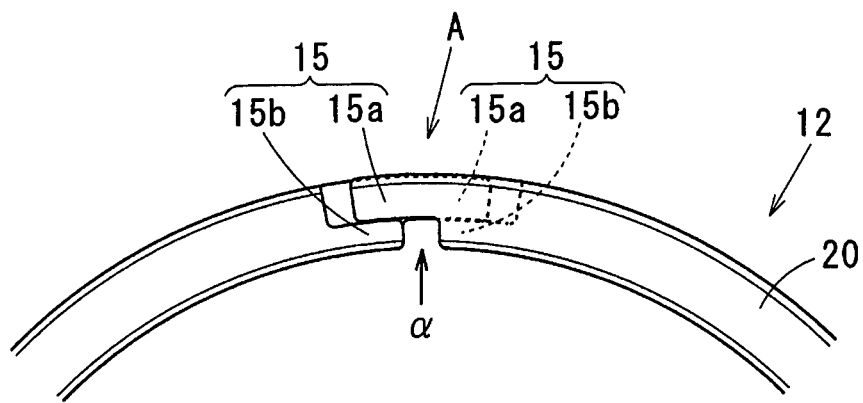
FIG. 4A is a view of an abutment joint of a seal ring according to a comparative example, the abutment joint being viewed along the plate thickness direction z.
Figure 4B:
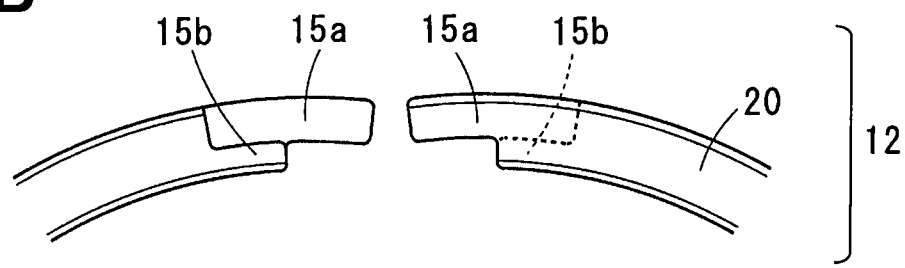
FIG. 4B is a view of the abutment joint in a separated state of the seal ring according to the comparative example, the abutment joint being viewed along the plate thickness direction z.
Figure 4C:
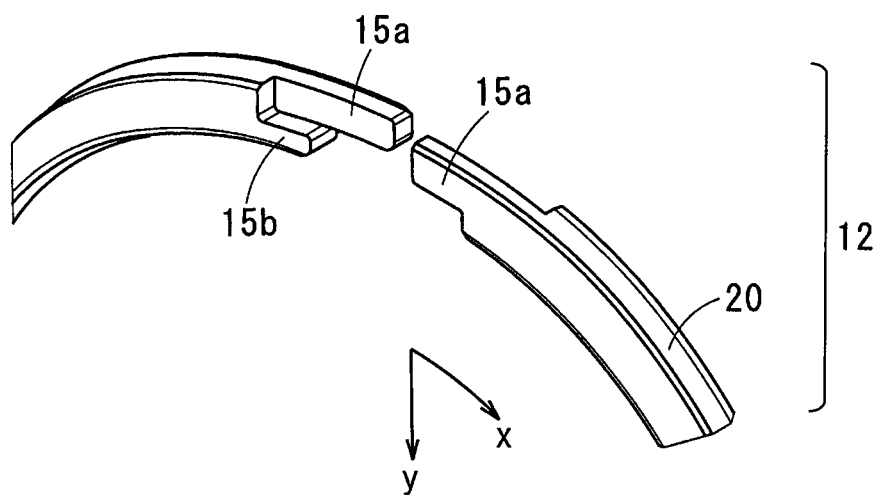
FIG. 4C is a perspective view of the abutment joint in a separated state of the seal ring according to the comparative example.

The seal ring 12 of the present embodiment can prevent a displacement in the abutment joint A in the radial direction y by the step cut joint 15 which is formed on the ends of the seal ring 12, the ends forming the abutment joint A, and eliminate a gap α (refer to FIG. 4A) in the abutment joint A with the lap joint 16 which includes the facing faces facing in the plate thickness direction z. That is, it is possible to provide the seal ring 12 that prevents a displacement in the abutment joint A in the radial direction y and has no gap a in the abutment joint A.

Second Effect of First Embodiment

As described above, the seal ring 12 of the present embodiment is used in the EGR valve 1. Thus, when the EGR valve 1 is closed, it is possible to prevent a failure of leakage of EGR gas through the abutment joint A of the seal ring 12. That is, it is possible to reduce leakage during closure of the EGR valve 1 and to improve the reliability of the EGR valve 1.

Third Effect of First Embodiment

The seal ring 12 of the present embodiment is made of a resin that is excellent in heat resistance, oil resistance, and wear resistance. Examples of the resin forming the seal ring 12 include resin materials such as PEEK, PPS, and PA, but not limited thereto, of course.

Figure 3D:
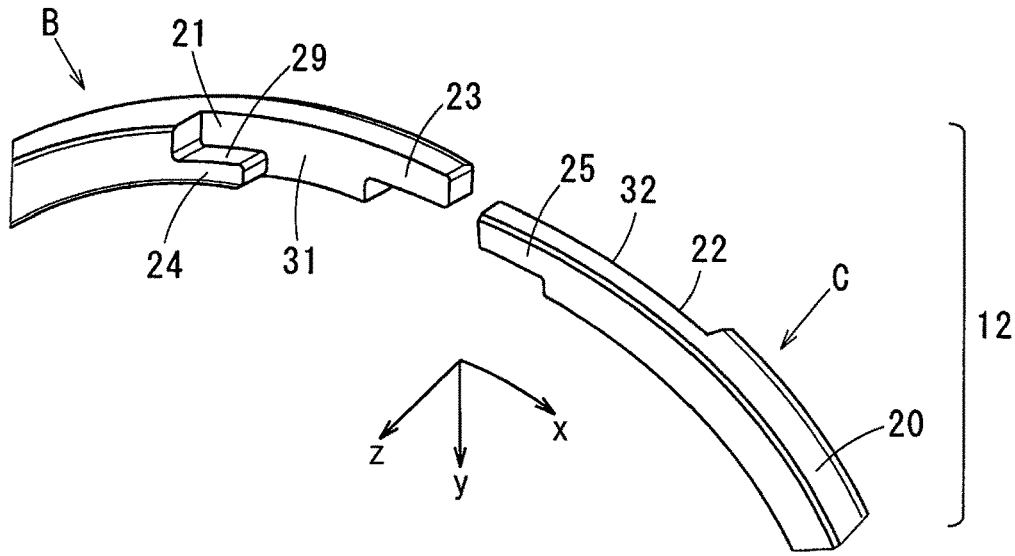
FIG. 3D is a perspective view of the abutment joint in a separated state of the seal ring according to the first embodiment.

Specifically, the seal ring 12 is formed by a resin molding technique in which a molten resin is poured into a resin mold and taken out of the resin mold after cured. This will be more specifically described. As illustrated in FIGS. 3B to 3D, the seal ring 12 is molded with the abutment joint A separated in the circumferential direction x by the resin molding technique. Subsequently, as illustrated in FIG. 3A, an overlap is formed in the overlapping part 14, and a heat treatment is applied with the seal ring 12 maintained in a perfect circle by a jig to form the seal ring 12 with an overlap in the overlapping part 14 even with the free length of the seal ring 12. The jig that maintains the seal ring 12 in a perfect circle maintains the seal ring 12 in a perfect circle having an outer diameter dimension slightly larger than the inner diameter dimension of the nozzle 7.

Such a seal ring 12 made of a resin makes it possible to easily manufacture the seal ring 12 which includes both of the step cut joint 15 and the lap joint 16. That is, it is possible to increase productivity of the seal ring 12 which includes the step cut joint 15 and the lap joint 16 and to provide the seal ring 12 which includes the step cut joint 15 and the lap joint 16 at low cost.

Other Embodiments

In the above embodiment, an example in which the seal ring 12 is made of a resin has been described. However, the present disclosure is not limited thereto, and the seal ring 12 may be made of a metal such as stainless steel.

In the above embodiment, an example in which the present disclosure is applied to the EGR valve 1 has been described. However, the present disclosure may be applied to a seal ring 12 that is used for the purpose different from the EGR valve 1. Specifically, the seal ring 12 of the present disclosure may be used in all on-off valves, flow regulating valves, and pressure regulating valves using the butterfly valve 4. Alternatively, the present disclosure may be applied to a seal ring 12 that is attached to a cylindrical body such as a piston.

As described above, both of the step cut joint 15 which prevents a displacement in the abutment joint A in the radial direction y and the lap joint 16 which closes the gap α in the abutment joint A are formed on the ends of the seal ring 12, the ends forming the abutment joint A. This enables to provide the seal ring 12 that prevents a displacement in the abutment joint A in the radial direction y and that includes no gap α in the abutment joint A.

Although the present disclosure has been described based on the embodiments, it is to be understood that the present disclosure is not limited to these embodiments and structures. The present disclosure also includes various modifications and modifications within the equivalent range thereof. In addition, various combinations or modes, and other combinations or modes including only one element, more, or less thereof are also included in the scope and idea range of the present disclosure.

The invention claimed is:

1. An EGR valve configured to be mounted on an engine of an automobile and to open and close an EGR passage to recirculate a part of exhaust gas in an exhaust passage of the engine therethrough to an intake passage of the engine, comprising:
   a housing having a nozzle forming a part of the EGR passage;
   a shaft rotatably supported by the housing;
   a butterfly valve fixed to an end of the shaft and configured to open and close the EGR passage; and
   a seal ring provided on an outer peripheral edge of the butterfly valve and configured to close a gap between the butterfly valve and an inner peripheral wall of the nozzle when the butterfly valve is fully closed, wherein
   the seal ring is fitted in an annular groove formed over an entirety of the outer peripheral edge of the butterfly valve, wherein
   the seal ring includes:
      a body in an annular shape and including an abutment joint at a location in a circumferential direction, wherein
      opposite ends of the body form the abutment joint and include an overlapping part where a first end and a second end of the body overlap each other,
      the overlapping part includes a step cut joint that forms an overlap in a radial direction and a lap joint that forms an overlap in a plate thickness direction,
      facing faces that face each other in the plate thickness direction in the lap joint are planes extending from an inner peripheral circular arc of the seal ring up to an outer peripheral circular arc of the seal ring, wherein
   the first end includes a first locking piece and a first locked piece,
   the second end includes a second locking piece and a second locked piece,
   the first locking piece is a projection that extends in a circumferential direction on an outer diameter side of the first end,
   the second locking piece is a projection that extends in the circumferential direction on an outer diameter side of the second end,
   the first locked piece is a step that extends in the circumferential direction on an inner diameter side of the first end,
   the second locked piece is a step that extends in the circumferential direction on an inner diameter side of the second end,
   the first locking piece and the first locked piece overlap with each other in the radial direction to form the step cut joint, and
   the second locking piece and the second locked piece face each other in the plate thickness direction to form the lap joint.

2. The EGR valve according to claim 1,
wherein the body is formed of a resin.

3. The EGR valve according to claim 1,
wherein the body is used in an EGR valve that recirculates a part of exhaust gas from an engine to an intake side of the engine as EGR gas.

4. The EGR valve according to claim 1, wherein
the shaft is inclined with respect to the nozzle, and
the butterfly valve is inclined with respect to the shaft.

5. A method for manufacturing the EGR valve according to claim 1, comprising:
forming the seal ring by a resin molding technique such that the first end and the second end are separated in the circumferential direction; and
maintaining, after the forming, the seal ring in a perfect circle by using a jig and applying a heat treatment to the seal ring, such that the first end and the second end are overlapped with each other in a state where the seal ring has a free length after the heat treatment, wherein
the perfect circle has an outer diameter dimension that is larger than an inner diameter dimension of the nozzle.

\* \* \* \* \*